United States Patent [19]

Rossmy

[11] 4,070,386

[45] Jan. 24, 1978

[54] PROCESS FOR THE PREPARATION OF ORGANOPOLYSILOXANE-POLYETHER COPOLYMERS WITH SIOC BONDS

[75] Inventor: Gerd Rossmy, Haltern, Germany

[73] Assignee: Th. Goldschmidt AG, Essen, Germany

[21] Appl. No.: 683,084

[22] Filed: May 4, 1976

Related U.S. Application Data

[63] Continuation of Ser. No. 517,297, Oct. 23, 1974, abandoned.

[30] Foreign Application Priority Data

Oct. 24, 1973  Germany .............................. 2353161

[51] Int. Cl.$^2$ ............................ C07F 7/04; C07F 7/18
[52] U.S. Cl. ...................... 260/448.8 R; 260/448.2 E; 260/448.2 P
[58] Field of Search .................. 260/448.8 R, 448.2 P, 260/448.2 E

[56] References Cited

U.S. PATENT DOCUMENTS

| | | | |
|---|---|---|---|
| 2,421,653 | 6/1947 | Sauer | 260/448.2 P X |
| 3,048,499 | 8/1962 | Jellinek | 260/448.8 R X |
| 3,115,512 | 12/1963 | Rossmy et al. | 260/448.8 R |
| 3,299,113 | 1/1967 | Haluska | 260/448.8 R |
| 3,661,962 | 5/1972 | Geipel | 260/448.2 E |

*Primary Examiner*—Paul F. Shaver
*Attorney, Agent, or Firm*—Toren, McGeady and Stanger

[57] ABSTRACT

A method for the preparation of organopolysiloxane-polyether copolymers where the polysiloxane blocks are linked to the polyether blocks through SiOC linkages is disclosed wherein a mixture of organo halogen silanes and organopolysiloxanes are equilibrated using a novel mixed catalyst of a hydrogen halide acid and a peralkylated acid amide. The process produces copolymers having improved shelf life which produce polyurethane foams having excellent stability and other advantages.

13 Claims, No Drawings

PROCESS FOR THE PREPARATION OF ORGANOPOLYSILOXANE-POLYETHER COPOLYMERS WITH SIOC BONDS

This is a continuation of application Ser. No. 517,297, filed Oct. 23, 1974, now abandoned.

The invention relates to a process for the preparation of organopolysiloxane-polyether copolymers, in which the polysiloxane blocks are bonded with the polyether blocks via SiOC bonds, by reacting in per se known manner halogens siloxanes with polyether compounds having hydroxyl groups.

A number of processes have become known in the art for the preparation of organopolysiloxane-polyether copolymers. The compounds are used in particular as foam stabilizers in the arresting of foaming in polyurethane processing, but also as textile and lacquer adjuvants and the like.

The properties of these known block copolymers can however be improved even further, in particular the stability of the compounds upon storage, preferably at elevated temperatures and in the presence of moisture.

The shelf life is being limited, among other factors, by residues of catalysts used to achieve the equilibrium state of the initial siloxanes or required to be added to compounds unsaturated in SiH groups. This involves for instance Fe, Pt, $SO_4$, and other groups.

It is the object of this invention to obviate these drawbacks. Surprisingly it was found that one obtains copolymers having an improved shelf-life if one performs the equilibrating of the halogen siloxanes used as base substances, with certain catalysts and under certain conditions and reacts the resultant halogen siloxanes with polyethers having hydroxyl groups.

The invention is therefore characterized by the fact that one uses as halogen siloxanes at least substantially equilibrated mixtures of halogen siloxanes obtained in that mixtures of organohalogen silanes and organopolysiloxanes or mixtures of organopolysiloxanes with terminal silyl halide groups which, in thedistribution of their molecular weight and/or the distribution of the individual siloxane structures, do not correspond to the statistic equilibrium are treated with mixed catalysts prepared from halogen hydracid and peralkylated acid amide in quantities of 0.002 to 0.2 mole/siloxane bond and that the catalyst system is subsequently removed by phase separation.

The advantageous properties of the organopolysiloxanes are frequently achieved already when the equilibrating reaction has not yet been fully terminated while the mixtures are at least substantially in equilibrium.

In this process, one uses preferably a mixed catalyst consisting of HCl and dimethyl formamide. With regard to the halogen atom, the halogen hydracid corresponds preferably to the silyl halide groups.

The mixed catalysts of the peralkylated acid amides with the halogen hydracids are present in the form of liquid mixtures or complexes in which the relationship of peralkylated acid amide to halogen hydracid can vary within wide limits. As stated already, dimethyl formamide is the peralkylated acid amide that is preferably to be used. In that process, it is particularly appropriate to use solutions of halogen hydracid in dimethyl formamide that are saturated at room temperature and that substantially correspond to the dimethyl formamide · 2 halogen hydracid complex. However, one can use also complex compounds containing excess as well as inadequate quantities of dimethyl formamide. one uses preferably molar ratios of halogen hydracid to dimethyl formamide that are > 1, in particular if one operates at elevated pressure.

The equilibrating is preferably performed at elevated temperatures, in particular temperatures > 50° C to 110° C. One uses preferably temperatures above 70° C. The upper limit of the equilibrating temperatures is set by the temperature of decomposition of the complex mixed catalysts. The reaction temperature to be given particular preference is at about 100° C.

The bringing about of the state of equilibrium proceeds particularly rapidly and is promoted if the process is carried out at elevated pressure. In that case, it is adequate to operate in closed reaction vessels and under the inherent pressure of the solutions of halogen hydracid in peralkylated acid amide that are brought about at the respective process temperature. As a result, one prevents that, at elevated temperature, amounts of halogen hydracid that are important to achieve the catalytic effect escape from the reaction mixture.

Although dimethyl formamide has been referred to above always as the peralkylated acid amide, this is not the only suitable peralkylated acid amide. Furthermore suitable are peralkylated amides whose alkyl groups have preferably not more than 4 carbon atoms. Particularly suitable proved to be in that case dimethyl acetamide and hexamethyl phosphoric acid triamide. Other products such as N-N'-tetramethyl urea, diethyl formamide, N-dimethylethyl phosphonic acid amide, N-N'-tetraethyl urea, diethyl acetamide can likewise be used. On account of the solubility relations, one uses such compounds also in the mixture with dimethyl formamide. (Solid catalysts require longer reaction times.)

In a further development of the process in accordance with the invention, the attaining of the equilibrium is achieved not only with the complexes described so far, but one uses in addition in per se known manner iron halide catalysts or their complex compounds with halogen hydracid. Compounds of this type are $FeX_3$ or $HFeX_4$, in which X denotes preferably Cl. One can use also other iron compounds that convert in the reaction mixture into $HFeX_4$, such as, for instance, ferric oxide and corresponding hydrated oxides.

The equilibrating process can be performed in several stages. In this case, the equilibrating involving the complex iron compounds occurs preferably in the initial stage.

The quantity of the mixed catalysts to be used is generally in the range of 0.002 to 0.2 mole/siloxane bond in the mixture. Particularly preferred is a quantity of 0.01 to 0.1 mole/siloxane bond in the mixture. If one uses additional amounts of $FeCl_3$ which, as mentioned above, presumably acts also in this case in the form of the complex acid $HFeCl_4$, quantities of 1 ppm to 1 percent-by-weight, preferably 0.001 to 0.1 percent-by-weight of this iron compound in connection with the abovementioned quantities of mixed catalyst in accordance with the invention are sufficient.

One may also include inert solvents in the equilibrating reaction in accordance with the invention. In view of the fact that the reaction mixture is heterogenous, one succeeds in simply separating the mixed catalysts and the dimethyl formamide that may possibly be present in excess by an ordinary phase separation.

From the German Pat. No. 1,285,471, it is known to prepare organopolysiloxanes with terminal silyl halide groups among other processes in the presence of dimethyl formamide. However, in that case the dimethyl formamide serves as a reaction medium for the hydrolysis of the chlorosilane. An equilibrating does not take place.

The British Pat. No. 1,040,147 describes likewise the preparation of organopolysiloxanes with terminal silyl halide groups in the presence of dimethyl formamide, however not in the complex form of the mixed catalyst used in accordance with the invention. Rather, the process in accordance with the British patent involves a telomerization reaction. This reaction is intended to achieve molecularly uniform halogen siloxanes, however not equilibrated mixtures.

The organopolysiloxane mixtures with terminal silyl halide groups to be used in accordance with the invention and whose molecular and structural distribution corresponds at least substantially to the statistic equilibrium can for instance be illustrated by the following formula I:

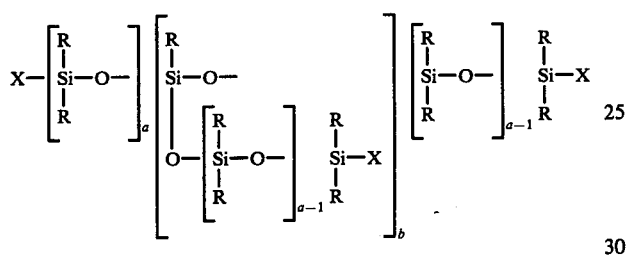

In this formula, R is preferably the methyl radical. R can however denote in part also another radical, possibly a substituted alkyl or aryl radical, that is inert to acids, such as, for instance:

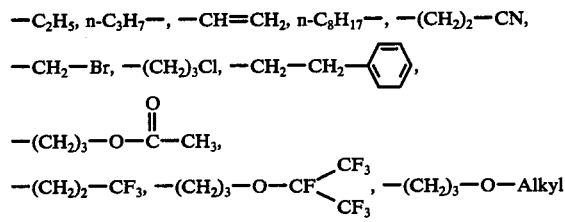

Additional data regarding substituents inert to acids in organopolysiloxanes and which can be equilibrated with acid catalysts, can be found in the work by W. Noll "Chemie und Technologie der Silicone", publisher: Vorlag Chemie GmbH (1968), as well as in the U.S. Pat. No. 3,115,512.

In the case of aryl radicals situated at the silicone atom, one must reckon during the equilibrating reaction to a certain extent with the separation of these radicals.

a is selected so that, in the average molecule, there are 2 to 100, preferably 4 to 50, Si atoms and that the ratio of the R radicals of nontrifunctional Si atoms bonded to such radicals, which are bonded to trifunctional Si atoms, amounts preferably to at least 4. b is in that case 0 to 50, preferably 0 to 10. The R radical situated on the formally trifunctional Si atom can partly or wholly denote the radical -O$_{0.5}$-having an intermolecular or intramolecular bonding effect. In this case, the molecule contains therefore also tetrafunctional Si atoms. X is a halide, preferably the chlorine and possibly the bromine radical. A part of the X radicals can also be a triorganosiloxy radical, in particular the trimethyl siloxy radical.

The following can be used as base substances for performing the process in accordance with the invention:

a. Molecularly uniform organopolysiloxanes with silyl halide groups. However, due to excessive costs attending their preparation, these products are hardly likely to be industrially used.

b. Mixtures of organohalogensilanes and organopolysiloxanes, in particular cyclic organopolysiloxanes. It may be assumed that, in this case, the primary step consists in a cleavage of the cyclosiloxane by the halogen hydracid, e.g.

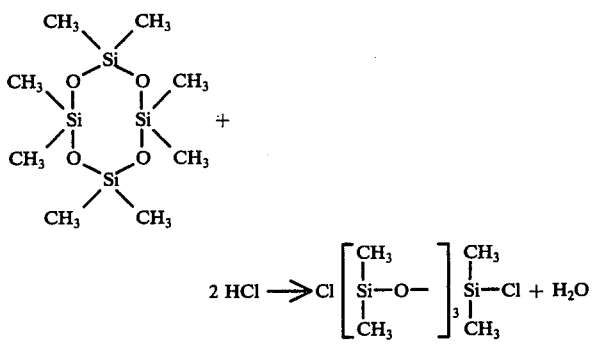

The water is preferably used up initially for the hydrolysis of the organohalogensilane. In the course of the equilibrating process in accordance with the invention, there is then brought about a redistribution of all Si-O-Si and Si-X bonds corresponding to the equilibrium.

c. Mixtures of organopolysiloxanes with or without silyl halide groups as can be obtained for instance by partial hydrolysis of organohalogensilanes. The overall gross composition of this mixture corresponds, as in the case of (a) and (b) also in this case to the average formula to be achieved and that has already been mentioned. The equilibrating modifies the distribution of the molecular weight as well as the distribution of individual siloxane building blocks in the molecules, however not the average composition.

The preparation of the block polymers from the above-described halogen siloxanes is performed in accordance with per se known processes, in which one can use for the reaction polyether mixtures that are optimally suited in accordance with the state of the art. As state of the art, mention can be made, among others, of the German Pat. Nos. 1,570,647, 1,694,366 and 1,930,546, and further the German Disclosures Nos. 1,595,730 and 1,694,304.

The products prepared by the process in accordance with the invention have the advantage of improved shelf life. In addition, the minor extent of secondary reactions in the course of the reaction results in an improved transfer of the process specifications upon going over to markedly different reagent volumes. In addition, one improves the dye numbers which is of particular importance if the products are to be used for fiber preparation.

The block polymers prepared in accordance with the invention are, given a corresponding selection of the polysiloxane blocks and polyether blocks, excellent stabilizers for polyurethane foams, antifoaming agents given a suitable adjustment of their hydrophilic properties and, as mentioned above, can be used in the preparation of textile and glass fibers. The products can furthermore be used in cosmetics and in soil-release finishing of textiles, as demulsifiers of petroleum emulsions, as separator agents and as paint flow agents. Generally speaking, they are interfacially active in aqueous and organic systems.

Preferred block polymers correspond to formula I on page 7, in which X is a polyether radical derived from the addition products of alkylene oxides on hydroxyl compounds. As alkylene oxides one uses preferably and practically exclusively ethylene oxide and/or propylene oxide. As hydroxyl compounds to which these alkylene oxides are added, one prefers alkanols. In that case, the polyethers are bonded to the siloxane structure via SiOC bonds. The polyether radicals can be terminal and be limited by hydroxyl, acyloxy or, respectively, alkoxy and aryloxy groups, the limiting by alkoxy radicals, in particular those having 1 to 4 carbon atoms, being preferred. It is however also possible to interconnect different siloxane blocks via the terminal groups which can for instance be achieved by the reaction of one process product, still containing SiCl groups, with two or several polyethers having OH groups.

The process in accordance with the invention is explained below by substantiating in particular the increase in the shelf life of the block copolymers prepared by the process in accordance with the invention, by using as an example the removal of foam in the preparation of polyurethane.

EXAMPLE

For the purpose of the tests of this example, one partially hydrolyzes in a given case a mixture of 299 g methyl trichlorosilane and 3,302 g dimethyl dichlorosilane by instilling of such a quantity of $H_2O$ that, following heating at 100° C, one obtains chloropolymethylsiloxane having $1.86 \cdot 10^{-3}$ g-atoms of Cl/g. This product corresponds to a siloxane mixture of formula I in which $R = CH_3$, $a = 5.4$, and $b = 2$.

In one instance, the hydrolysis is performed with a silane mixture respectively containing, with respect to the product of the hydrolysis, 0.01 to 0.0001 weight-percent of $FeCl_3$. In other instances there were used silanes purified by distillation. The equilibrating by using the catalyst dimethyl formamide · 2 HCl is performed at 100° C during a period of 6 hours and a catalyst strength of 0.02 mole dimethyl formamide/Si. A repetition of this test involving the use of 0.2 mole dimethyl formamide/Si results in a chlorosiloxane having practically identical properties.

The table below illustrates the products obtained under various conditions:

| Addition of $FeCl_3$ during the hydrolysis | Equilibration with DMF · 2 HCl in open vessel | Equilibration with DMF · 2 HCL in closed vessel |
| --- | --- | --- |
| A — | — | — (control test) |
| B — | + | — |
| C — | — | + |
| D + (0.01 weight-%) | — | + |
| E + (0.001 weight-%) | — | + |

The chlorosiloxanes A to D are reacted with a polyether mixture obtained through the addition of propylene and ethylene oxide in statistic sequence to n-butanol, in which the addition had been terminated by the adding of 2 moles propylene oxide. The molecular weight of the polyoxyalkylene block was 1,980 and the weight ratio of the propylene oxide to the ethylene oxide amounted to 51 : 49. For the reaction, 50 g of the siloxane are mixed with the azeotropically dried polyether dissolved in 770 ml toluene. To each SiCl grouping there corresponds 0.95 mole polyether monool. In addition, the solution contains also 0.17 mole of isopropanol. The temperature of the reaction is 50° C. After 30 minutes, $NH_3$ is introduced into the solution until the alkaline reaction is obtained, the solution is filtered, and the block polymers isolated by evaporation. For the purpose of stabilization, 0.4 percent-by-weight of butyl ethanol amine are added to the product. As a measure for the rapprochement toward the equilibrium, one can use the viscosity of the block polymer as well as the density of a polyurethane foam prepared in accordance with the following recipe with the use of the block polymer. The following foam recipe was used:

100.00 parts by weight of polyol having an OH number of 47.5 and an ethylene oxide to propylene oxide ratio of 5 : 95, prepared by the addition of alkylene oxide to glycerin
4.05 parts by weight of $H_2O$
3.00 parts by weight of trichlorofluoromethane
0.80 parts by weight of siloxane-polyether block polymer
0.27 parts by weight of tin octoate
0.15 parts by weight of dimethyl ethanol amine
0.05 parts by weight of N-ethyl morpholine
52.50 parts by weight of toluylene diisocyanate T 80

| CL siloxane used | Viscosity of the block polymer at 20° C (cP) | Density of the foam (prepared at a pressure of 760 mm) (kg/m$_3$) |
| --- | --- | --- |
| A | 536 | Foam unusable due to collapse |
| B | 850 | 24.5 |
| C | 960 | 22.9 |
| D | 1,374 | 22.0 |
| E | 1,170 | 22.2 |

The foam stabilizers prepared from B to E were stored for four weeks at 80° C. Their properties proved to be completely unchanged upon their use in the preparation of foams following that period, that is to say, one obtained densities identical to those achieved initially. Foam stabilizers with identical overall compositions and which had been prepared with 1.6 g sulfuric acid/Si atom and 0.01 weightpercent of iron chloride, respectively, with respect to the chlorosiloxane to be brought into equilibrium, showed, following storage, an increase by respectively 0.6 and 4.2 kg/m$^3$.

What is claimed is:
1. A process of preparing organopolysiloxanepolyether copolymers of the kind wherein the polysiloxane blocks are linked to the polyetherblocks through SiOC-linkages, which comprises:
   1. equilibrating mixtures of organohalogensilanes and organopolysiloxanes or mixtures of organopolysiloxanes with terminal silylhalide groups in the presence of an equilibration catalyst, the molecular weight distribution or the distribution of the individual siloxane structures of the mixtures to be equilibrated deviating from the statistical equilibrium and said equilibration catalyst being a mixed catalyst comprising
      a. hydrogen halide acid and
      b. peralkylated acid amide,
   the amount of said mixed catalyst being in the range of 0.002 to 0.2 mole per siloxane bond to obtain at least approximately equilibrated mixtures of halogen siloxanes, 2. separating the mixed catalyst from the halogen siloxanes by phase separation, and
3. reacting the halogen siloxanes thus obtained with hydroxyl group containing polyether compounds.

2. A process as claimed in claim 1, wherein said acid of
   a. is HCl, while said amide of
   b. is dimethylformamide.

3. A process as claimed in claim 1, wherein the equilibration treatment is carried out at a temperature of > 50° to 110° C.

4. A process as claimed in claim 1, wherein the equilibration treatment is carried out under a pressure which is above atmospheric pressure.

5. A process as claimed in claim 1, wherein the equilibration treatment is carried out in a closed reaction vessel at that pressure which is the corollary of the temperature of the reaction mixture.

6. A process as claimed in claim 1, wherein said mixed catalyst essentially consists of dimethylformamide · 2 HCl and said equilibration treatment is performed at about 100° C.

7. A process as claimed in claim 1, wherein said silylhalide groups are SiCl groups.

8. A process as claimed in claim 1, wherein said catalyst additionally contains $HFeCl_4$ in amounts of 1 ppm to 1 percent by weight, calculated on each siloxane bond in the mixture to be equilibrated.

9. A process as claimed in claim 8, wherein 0.001 to 0.1 percent by weight of $HFeCl_4$ is used.

10. A process as claimed in claim 1, wherein the equilibration treatment is performed in stage wise manner.

11. A process as claimed in claim 10, wherein the equilibration treatment is initiated with said $HFeCl_4$ whereafter the equilibration treatment is continued and terminated with said mixed catalyst of (a) and (b) in one or several stages.

12. A process as claimed in claim 1, wherein said mixed catalyst of (a) and (b) is in the form of liquid mixtures or complexes.

13. A process as claimed in claim 1, wherein said mixed catalyst is a room-temperature saturated solution of hydrogen halide acid in dimethylformamide.

* * * * *